Sept. 2, 1958  A. STRAZDINS  2,850,042
CONTROL DEVICE FOR TWIN VALVES

Filed Dec. 6, 1955  3 Sheets-Sheet 1

INVENTOR
ATIS STRAZDINS
By Emory L. Groff
Atty

Sept. 2, 1958 A. STRAZDINS 2,850,042
CONTROL DEVICE FOR TWIN VALVES

Filed Dec. 6, 1955 3 Sheets-Sheet 2

INVENTOR
ATIS STRAZDINS
By Emery L. Groff
Atty

United States Patent Office 2,850,042
Patented Sept. 2, 1958

2,850,042

CONTROL DEVICE FOR TWIN VALVES

Atis Strazdins, Primbee, New South Wales, Australia

Application December 6, 1955, Serial No. 551,446

Claims priority, application Australia February 4, 1955

7 Claims. (Cl. 137—636.2)

This invention has been devised to provide a control device for twin valves in a valve chest having a separate inlet for each valve and an outlet common to both valves. The control device is a single unit common to both valves; it can be manipulated to regulate the flow from one inlet relative to the other or to regulate the flow from either inlet independently.

While the control device is useful to enable different liquids to be proportionally mixed in the valve chest it is particularly useful applied to household hot and cold water systems to regulate the discharge and the temperature of the discharge.

The control device is a first order valve actuating lever having a fulcrum in valve chest, the fulcrum being constructed to permit movement of the lever throughout a segment of a sphere. A hand operated lever actuating device is mounted on the valve chest. The mounting is such that it can be moved in a plane a distance equivalent to the distance between the centres of two valves in the valve chest positioned radially from a common centre. The hand operated device has its work end in a thrust engaging relationship with the power end of the valve actuating lever. The work end of the valve actuating lever is in actuating relationship with the ends of the stems of the two valves, which stems project from the valves towards the common centre. The valves have seats on inlets to the valve chest and are arranged to be opened by the valve actuating lever against the pressure of liquid in pipes connected to the inlets. There is a delivery outlet from the valve chest. Springs may be provided to assist in closing the valves. The hand operated device may be a lever having the fulcrum mounted for movement as stated above, or it may be a spindle provided with a hand grip and screwed into a casing part rotatably mounted on the valve chest. The inner end of the spindle can be moved into thrust engaging relationship with the power end of the valve actuating lever.

The invention is described in further detail with reference to the annexed drawings wherein Fig. 1 is a side sectional elevation of a valve chest showing the control device and a hand lever.

Figure 1:
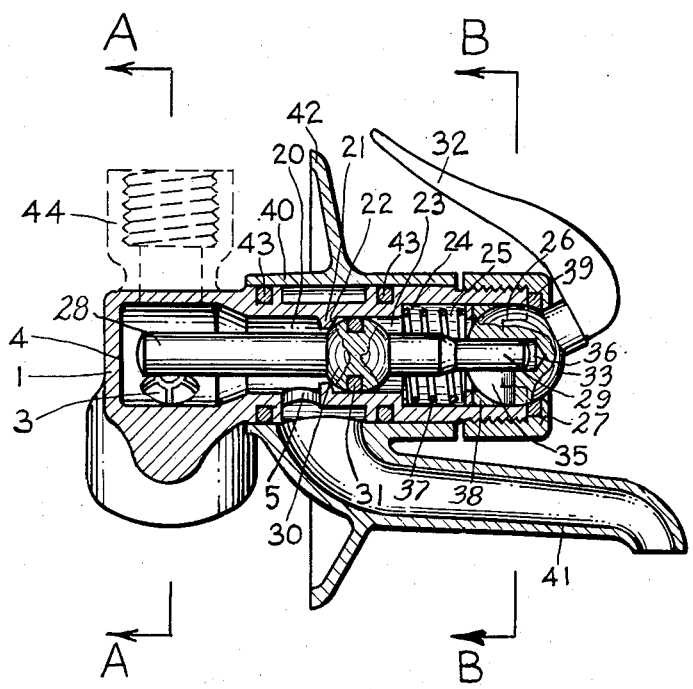
Figure 2:
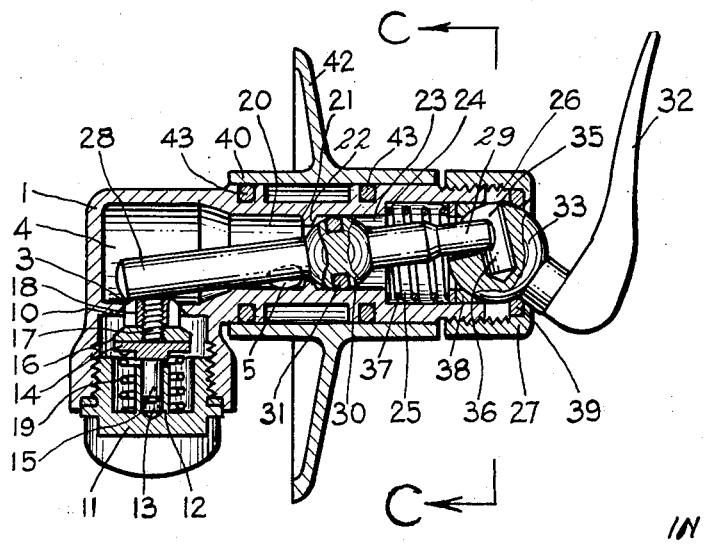
Fig. 2 is also a side sectional elevation of the valve chest showing one movement of the control device and a valve in open position.
Figure 3:
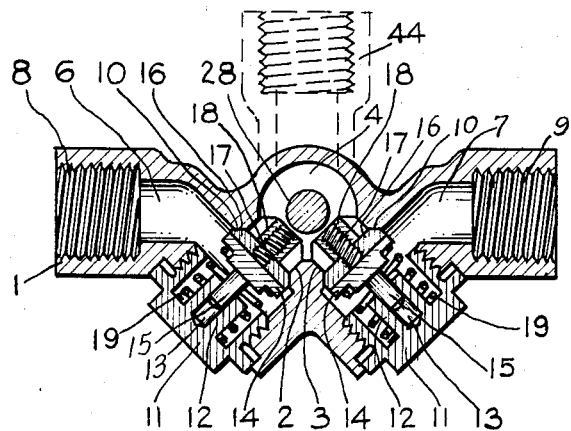
Fig. 3 is a section on line A—A of Fig. 1 showing the two valves and part of the valve actuating lever.
Figure 4:
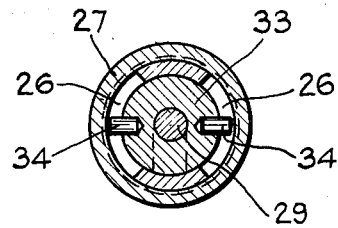
Fig. 4 is a section on line B—B of Fig. 1.
Figure 5:
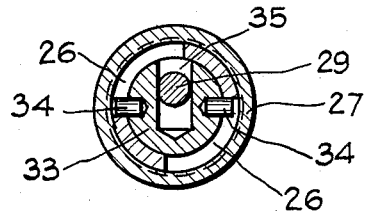
Fig. 5 is a section on line C—C of Fig. 2.

Referring to Figs. 1 to 5 the valve chest 1 has two inlet ports 2 and 3 to chamber 4 and an outlet port 5 from the chamber 4. The inlet ports 2 and 3 are located radially from the centre of the chamber 4 on a common plane and at an angle of approximately 90 degrees apart. Ducts 6 and 7 connect the inlet ports to parts 8 and 9 of the valve chest which are screwed to receive pipes such as pipes supplying hot and cold water respectively.

There is a valve seat 10 on each inlet port 2 and 3 and the outer walls of the ducts 6 and 7 are drilled and screwed in axial alignment with ports 2 and 3 to take a valve cap 11. Each valve cap has an internal boss 12 which is bored axially as at 13.

A jumper valve consisting of a head 14, a guide spindle 15, a face 16, a stem supporting screw 17 and fluted stem 18 is mounted in each duct 6 and 7 to register with a valve seat 10 on the respective ports 2 and 3. Each valve is retained in position by the guide spindle 15 homing in the bore 13 of the valve cap boss 12 and the fluted stem 18 engaging the walls of the respective ports 2 and 3. A helical spring 19 anchored on each boss 12 is arranged to thrust the valve onto its seat. The pressure of water in the ducts 6 and 7 also acts to thrust the respective valves onto their seats.

A cylindrical lever chamber 20 which is an extension of the valve chest 1 in axial alignment therewith and open thereto, has a shoulder 21 therein. The outer face of the shoulder is formed as a seating 22 and outwardly therefrom is a fulcrum chamber 23. Outwardly from the fulcrum chamber there is a step 24 and an extension of the chamber is enlarged as at 25. Two slots 26 are formed in the end of the chamber and the outer wall of the chamber is screwed to take a keeper 27.

The first order lever is a rod having a work end 28, a power end with a head 29 reduced in diameter and a spherical fulcrum 30 having a groove in its periphery to accommodate a sealing ring 31. The lever is accommodated in the lever and fulcrum chamber with the fulcrum 30 in register with the seating 22, and the sealing ring 31 in register with the wall of the chamber. The work end of the lever is in actuating relationship with the ends of both fluted valve stems 18 and the power end extends to or near the outer end of the chamber 4.

A hand lever 32 has a spherical head 33 with fulcrum pins 34 projecting therefrom laterally in relation to the lever. There is a slot 35 in the head 33 at 90 degrees to the fulcrum pins. The slot extends over an area of approximately 90 degrees and its end walls are at such approximate angle one to the other. A well 36 is formed in the slot 35 to accommodate the head 29 of the first order lever.

The spherical head 33 is accommodated in the enlarged part 25 of the lever chamber with the fulcrum pins 34 in the slots 26. The lever 32 projects through the keeper 27 which retains the lever in position. A helical spring 37 in the part 25 of the lever chamber thrusts a friction ring 38 against the spherical head and the latter against a second friction ring 39 accommodated in the keeper 27. The head 29 of the power end of the first order lever is entered into the slot 35 of the spherical head 33 when several parts are assembled. The friction of the rings 38—39 is sufficient to hold the hand lever in any position to which it is moved.

In operation, if the hand lever 32 is moved laterally to bring it in alignment with one of the inlet valves the sides of the slot 35 are also in alignment with that inlet valve and by depressing the hand lever when in such position, the head 29 of the first order lever is thrust in one direction and the work end 28 is thrust in the opposite direction against the fluted stem 18 of the inlet valve which is opened thereby. If the hand lever 32 is moved to a position midway between the two inlet valves and operated as stated above both said valves are opened a uniform amount. One valve can be opened proportionally to the other by appropriate movement of the hand lever. The slots 26 are of such length that the fulcrum pins 34 can be moved to permit the operation of the hand lever as stated above.

In the embodiment illustrated in Figs. 1 to 5 a sleeve 40 is mounted on the cylindrical lever chamber 20 and it is retained in position by the keeper 27. The sleeve 40 has a delivery spout 41 with its inner end in register with the outlet port 5. A wall plate 42 is formed on the sleeve. Sealing rings 43 prevent leakage. In place of the sleeve and spout the valve chest may be provided with an outlet pipe 44 shown in dotted lines and the outlet port 5 located to register therewith.

Figures 6, 8, 9:
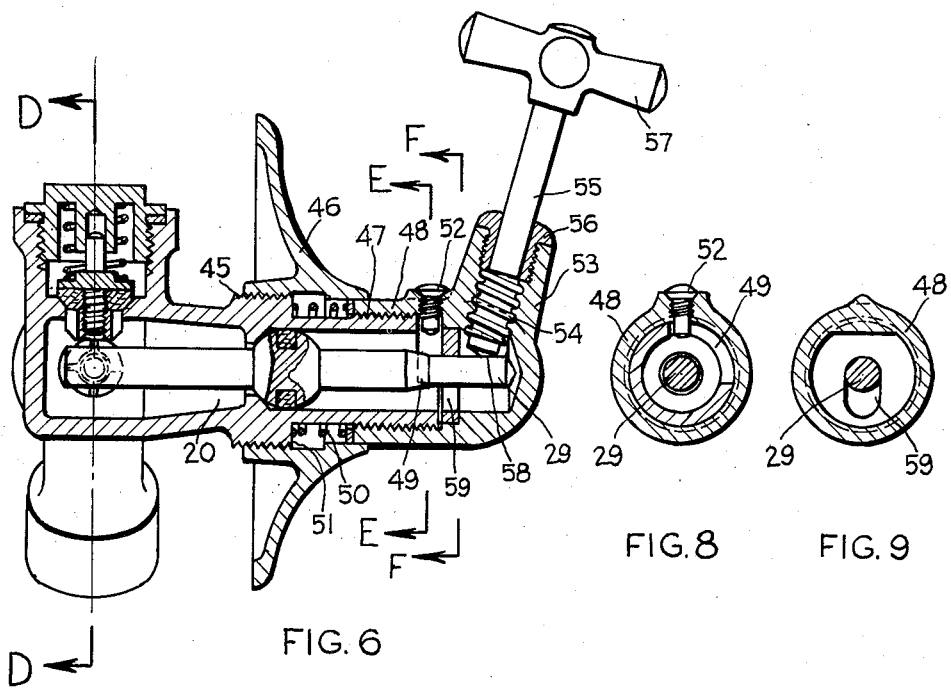
Fig. 6 is a sectional elevation of a modified construction showing in particular how a spindle is substituted for the hand lever.
Fig. 8 is a section on line E—E of Fig. 6.
Fig. 9 is a section on line F—F of Fig. 6.
Figure 7:
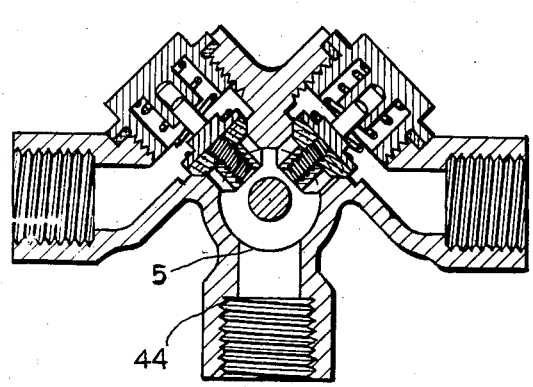
Fig. 7 is a section on line D—D of Fig. 6 showing two valves and a part of the valve actuating lever.

Referring to Figs. 6 to 9 it will be seen that a spindle with a conventional tap handle is substituted for the hand lever 32. These figures also show how the outlet port 5 is connected directly to an outlet pipe 44. It will be understood that the delivery spout can be substituted for the outlet pipe connection. In all other essential respects the control device shown in these figures is the same as that shown in Figs. 1 to 5 and the same references are used to describe them.

In this embodiment the chamber 20 is screwed externally as at 45 to take a wall plate 46 and screwed as at 47 to take a keeper 48. In addition the chamber has a slot 49 in its periphery in place of the end slots 26.

The keeper 48 mounted as stated above compresses a helical spring 50 against a shoulder 51 on the chamber. The spring places a resilient restriction on the movement of the keeper. This movement is limited to approximately 90 degrees by a grub screw 52 which has a pin extension entered in the slot 49. An offset lug 53 on the keeper is bored and screwed to take the screwed part 54 of a spindle 55 and outwardly therefrom is screwed to take a nut 56 which incorporates a neck bush. The spindle is provided with a turn knob 57. The inner end 58 of the spindle is brought into engagement with the head 29 of the first order lever by screwing and by applying side pressure to the spindle it will move the lever to operate the valves in the same manner as the hand lever described previously.

The head 29 of the first order lever is held in position to be engaged by the spindle by a slotted plate 59 mounted in the keeper 48.

I claim:

1. A control device for twin valves said valves being positioned in a valve chest and being reciprocable along respective axes extending radially from a common center, consisting of a first order valve actuating lever having a fulcrum in said valve chest, said fulcrum being constructed to permit movement of the lever throughout a segment of a sphere, a hand operated lever actuating device mounted on the valve chest, said mounting providing angular movement in a plane parallel to the plane of said valve axes an amount equivalent to the angle between the axes of said two valves, said angle between the valve axes being substantially less than one hundred and eighty degrees, said lever actuating device having its work end in thrust engaging relationship with the power end of the valve actuating lever, the work end of said valve actuating lever being in actuating relationship with the ends of the stems of said valves, said valve stems projecting towards said common centre, said valves having seats on inlets to the valve chest and arranged to be opened by the valve actuating lever against the pressure of liquid in pipes connected to said inlets, and a delivery outlet in said valve chest.

2. A control device for twin valves said valves being positioned in a valve chest and being reciprocable along respective axes extending radially from a common center, consisting of a first order valve actuating lever having a fulcrum in said valve chest, said fulcrum being constructed to permit movement of the lever throughout a segment of a sphere, a hand operated lever actuating device consisting of a spindle provided with a hand grip, said spindle being screwed into a casing part rotatably mounted on the valve chest, said spindle providing angular movement in a plane parallel to the plane of said valve axes an amount equivalent to the angle between the axes of said two valves, said angle between the valve axes being substantially less than 180° said spindle being adapted to be moved to bring its inner end into thrust engaging relationship with a power end of said valve actuating lever, the work end of said valve actuating lever being in actuating relationship with the ends of the stems of said valves, said valve stems projecting towards said common centre, said valves having seats on inlets to the valve chest and arranged to be opened by the valve actuating lever against the pressure of liquid in pipes connected to said inlets, said valve chest also having a delivery outlet.

3. A control device for twin valves positioned in a valve chest and reciprocable along respective axes extending radially from a common center, said valve chest having two inlet ports located radially from the centre of a chamber in said chest, ducts connecting said ports with parts of the valve chest screwed to receive pipes, the outer walls of said ducts having valve caps screwed therein and in axial alignment with said ports, said valve caps each having an internal boss bored axially, a valve to seat on each inlet port having a fluted stem projecting through its port and a guide spindle homing in the bore of its valve cap, a helical spring between each valve cap and valve, a delivery outlet from said valve chest, a first order valve actuating lever having a fulcrum in said valve chest, said fulcrum being constructed to permit movement of the lever throughout the segment of a sphere, a hand operated lever actuating device mounted on the valve chest, said mounting providing angular movement in a plane parallel to the plane of said valve axes an amount equivalent to the angle between the axes of said two valves, said angle between the valve axes being substantially less than one hundred and eighty degrees, said lever actuating device having its work end in thrust engaging relationship with the power end of the valve actuating lever, the work end of said valve actuating lever being in actuating relationship with the ends of said valve stems, said valves being arranged to be opened by the valve actuating lever against the pressure of liquid in said pipes.

4. A control device for twin valves positioned in a valve chest and reciprocable along respective axes extending radially from a common center, said valve chest having two inlet ports located radially from the centre of a chamber in said chest, ducts connecting said ports with parts of the valve chest screwed to receive pipes, the outer walls of said ducts having valve caps screwed therein and in axial alignment with said ports, said valve caps each having an internal boss bored axially, a valve to seat on each inlet port having a fluted stem projecting through its port and a guide spindle homing in the bore of its valve cap, a helical spring between each valve cap and valve, a delivery outlet from said valve chest, a cylindrical lever chamber as an extension of the valve chest and in axial alignment therewith, a shoulder in said chamber having a seating thereon, a first order valve actuating lever in said chamber having a spherical fulcrum in register with said seating, a hand operated lever actuating device mounted on the valve chest, said mounting providing angular movement in a plane parallel to the plane of said valve axes an amount equivalent to the angle between the axes of said two valves, said angle between the valve axes being substantially less than one hundred and eighty degrees, said lever actuating device having its work end in thrust engaging relationship with the power end of the valve actuating lever, the work end of said valve actuating lever being in actuating relationship with the ends of said valve stems, said valves being arranged to be opened by the valve actuating lever against the pressure of liquid in said pipes.

5. A control device for twin valves positioned in a valve chest and reciprocable along respective axes extending radially from a common center, said valve chest having two inlet ports located radially from the centre of a chamber in said chest, ducts connecting said ports with parts of the valve chest screwed to receive pipes, the outer walls of said ducts having valve caps screwed therein and in axial alignment with said ports said valve caps each having an internal boss bored axially, a valve to seat on each inlet port having a fluted stem projecting through its port and a guide spindle homing in the bore of its valve cap, a helical spring between each valve cap and valve, a delivery outlet from said valve chest, a cylindrical lever chamber as an extension of the valve chest and in axial alignment therewith, a shoulder in said chamber having a seating thereon, a first order valve actuating lever in said chamber having a spherical fulcrum in register with said seating, two slots formed in the end of said chamber and a keeper screwed on said end, a hand lever having a spherical head with fulcrum pins projecting laterally therefrom adapted to be accommodated in said slots, a slot in the spherical head located at 90 degrees to the fulcrum pins adapted to accommodate the power end of the valve actuating lever, said hand lever providing angular movement in a plane parallel to the plane of said valve axes an amount equivalent to the angle between the axes of said two valves, said angle between the valve axes being substantially less than 180° the work end of said hand lever being in thrust engaging relationship with the power end of the valve actuating lever, the work end of said valve actuating lever being in actuating relationship with the ends of said valve stems, said valves being arranged to be opened by the valve actuating lever against the pressure of liquid in said pipes.

6. A control device for twin valves positioned in a valve chest and reciprocable along respective axes extending radially from a common center, said valve chest having two inlet ports located radially from the centre of a chamber in said chest, ducts connecting said ports with parts of the valve chest screwed to receive pipes, the outer walls of said ducts having valve caps screwed therein and in axial alignment with said ports, said valve caps each having an internal boss bored axially, a valve to seat on each inlet port having a fluted stem projecting through its port and a guide spindle homing in the bore of its valve cap, a helical spring between each valve cap and valve, a delivery outlet from said valve chest, a cylindrical lever chamber as an extension of the valve chest and in axial alignment therewith, a shoulder in said chamber having a seating thereon, a first order valve actuating lever in said chamber having a spherical fulcrum in register with said seating, a keeper screwed on the end of said chamber having a grub screw entered into a slot in the wall of the chamber, an offset lug on said keeper bored and screwed internally, a hand operated spindle having a screwed part complementary to said bore screwed and entered therein, said spindle providing angular movement in a plane parallel to the plane of said valve axes an amount equivalent to the angle between the axes of said two valves, said angle between the valve axes being substantially less than 180° the inner end of said spindle being adapted to be moved into thrust engaging relationship with the power end of said valve actuating lever, the work end of said valve actuating lever being in actuating relationship with the ends of said valve stems, said valves being arranged to be opened by the valve actuating lever against the pressure of liquid in said pipes.

7. A control device for twin valves according to claim 1 having a hand-operated lever actuating device consisting of a lever having a fulcrum mounted for angular movement in a plane parallel to the plane of said valve axes an amount equivalent between the axes of said two valves, said angle between the valve axes being substantially less than 180°.

References Cited in the file of this patent

FOREIGN PATENTS

| 48,596 | Denmark | Mar. 23, 1934 |
| 452,067 | Italy | Oct. 6, 1949 |
| 149,828 | Sweden | Apr. 26, 1955 |